(12) United States Patent
Hou et al.

(10) Patent No.: US 9,061,609 B2
(45) Date of Patent: Jun. 23, 2015

(54) CAR SEAT BASE WITH A SELF-KEEPING LOCK MECHANISM

(71) Applicant: LERADO (ZHONG SHAN) INDUSTRIAL CO., LTD., Zhong Shan, Guang Dong Province (CN)

(72) Inventors: Hung-Chung Hou, Taibao (TW); Yu-Te Chou, Chiayi County (TW); Yu-Le Lin, Yunlin County (TW)

(73) Assignee: LERADO (ZHONG SHAN) INDUSTRIAL CO., LTD., Zhong Shan, Guang Dong Province (CN)

( * ) Notice: Subject to any disclaimer, the term of this patent is extended or adjusted under 35 U.S.C. 154(b) by 0 days.

(21) Appl. No.: 14/027,902

(22) Filed: Sep. 16, 2013

(65) Prior Publication Data

US 2015/0048661 A1    Feb. 19, 2015

(30) Foreign Application Priority Data

Aug. 15, 2013 (CN) ...................... 2013 2 0500624 U

(51) Int. Cl.
*B60N 2/44* (2006.01)
*B60N 2/28* (2006.01)
*B60N 2/42* (2006.01)

(52) U.S. Cl.
CPC ............... *B60N 2/28* (2013.01); *B60N 2/2827* (2013.01); *B60N 2/43* (2013.01); *B60N 2/44* (2013.01)

(58) Field of Classification Search
CPC .............. B60N 2/28; B60N 2/43; B60N 2/44; B60N 2/2821; B60N 2/286; B60N 2/2806; B60N 2/2845; B60N 2/24; B62J 1/00; B62J 1/08; B62J 1/02; B62J 1/002; B62J 1/007
USPC ................... 297/440.22, 440.1, 195.1, 216.1, 297/256.16
See application file for complete search history.

(56) References Cited

U.S. PATENT DOCUMENTS

| | | | | |
|---|---|---|---|---|
| 3,171,685 A | * | 3/1965 | Hershberger et al. | 297/92 |
| 3,915,493 A | * | 10/1975 | Brown | 296/63 |
| 5,326,067 A | * | 7/1994 | Gonzalez | 248/503.1 |
| 6,623,071 B2 | * | 9/2003 | Kawamoto et al. | 297/195.13 |
| 6,648,408 B1 | * | 11/2003 | Grove | 297/195.13 |
| 7,708,326 B2 | * | 5/2010 | Misaki et al. | 296/37.1 |

* cited by examiner

*Primary Examiner* — Milton Nelson, Jr.
(74) *Attorney, Agent, or Firm* — Muncy, Geissler, Olds & Lowe, P.C.

(57) ABSTRACT

A car seat base with a self-keeping lock mechanism for releasably locking a car seat rested thereon. The car seat has a pair of rods fixed at its underside, and the self-keeping lock mechanism is characterized by including at least a front hook element and a rear hook element and at least a front positioner and a rear positioner. The front hook element and the rear hook element are spaced apart from each other and pivoted inside the car seat base for locking the rods in a closed position, and releasing the rod in an opened position; the front positioner and the rear positioner are pivoted near the hook elements for keeping the hook elements in the opened position before the rods being entered into and caught by the hook elements, and may keep the hook elements in the closed position when the rods have been locked by the hook elements.

13 Claims, 6 Drawing Sheets

CAR SEAT BASE WITH A SELF-KEEPING LOCK MECHANISM

BACKGROUND OF THE INVENTION

1. Field of the Invention

The present invention relates a car seat base, especially to a car seat base equipped with a self-keeping lock mechanism preventing the hook elements in the car seat base from opening in severe vibration.

2. Description of the Related Art

Car seat bases are basically can use to connect a car seat and provides an easy installation of the car seat in a vehicle. The connection between the car seat and the base relies on a set of spring-biased hook elements mounted inside the base.

If two vehicles collide together, the inertial force on the baby occupant can be up to 10 times their weight. If some of the spring-biased hook elements opened accidently due to a severe vibration, the baby occupant may fly with the car seat forwardly from the base, this would seriously endanger the baby occupant's life in traffic accident.

SUMMARY OF THE INVENTION

For preventing the hook elements in the car seat base from open in severe vibration, the present invention provides a car seat base with a self-keeping lock mechanism for releasably locking a car seat rested thereon. The car seat has a pair of rods fixed at the underside, and the self-keeping lock mechanism is characterized by including at least a front hook element and a rear hook element and at least a front positioner and a rear positioner.

The front hook element and the rear hook element are spaced apart from each other and pivoted inside the car seat base for locking the rods in a closed position, and releasing the rod in an opened position.

The front positioner and the rear positioner are pivoted inside the car seat base and near the hook elements. Before the rods of the car seat being entered into and caught by the hook elements, the positioners kept the hook elements in the opened position, this saves the troublesome to open the hook elements by hand therefore can provide a convenience when loading the car seat onto the car seat base.

Besides, when the rods have been entered and caught by the hook elements, the hook elements are kept in the closed position by the positioners, this can prevent the pair of rods from releasing the hook elements upon the car seat base encountered a severe vibration in a vehicle.

BRIEF DESCRIPTION OF THE DRAWINGS

The accompanying drawings, which are included to provide a further understanding of the invention are incorporated in and constitute a part of this specification, illustrate embodiments of the invention and together with the description serve to explain the principles of the invention. In the drawings.

DETAILED DESCRIPTION OF THE PREFERRED EMBODIMENTS

Figure 1:
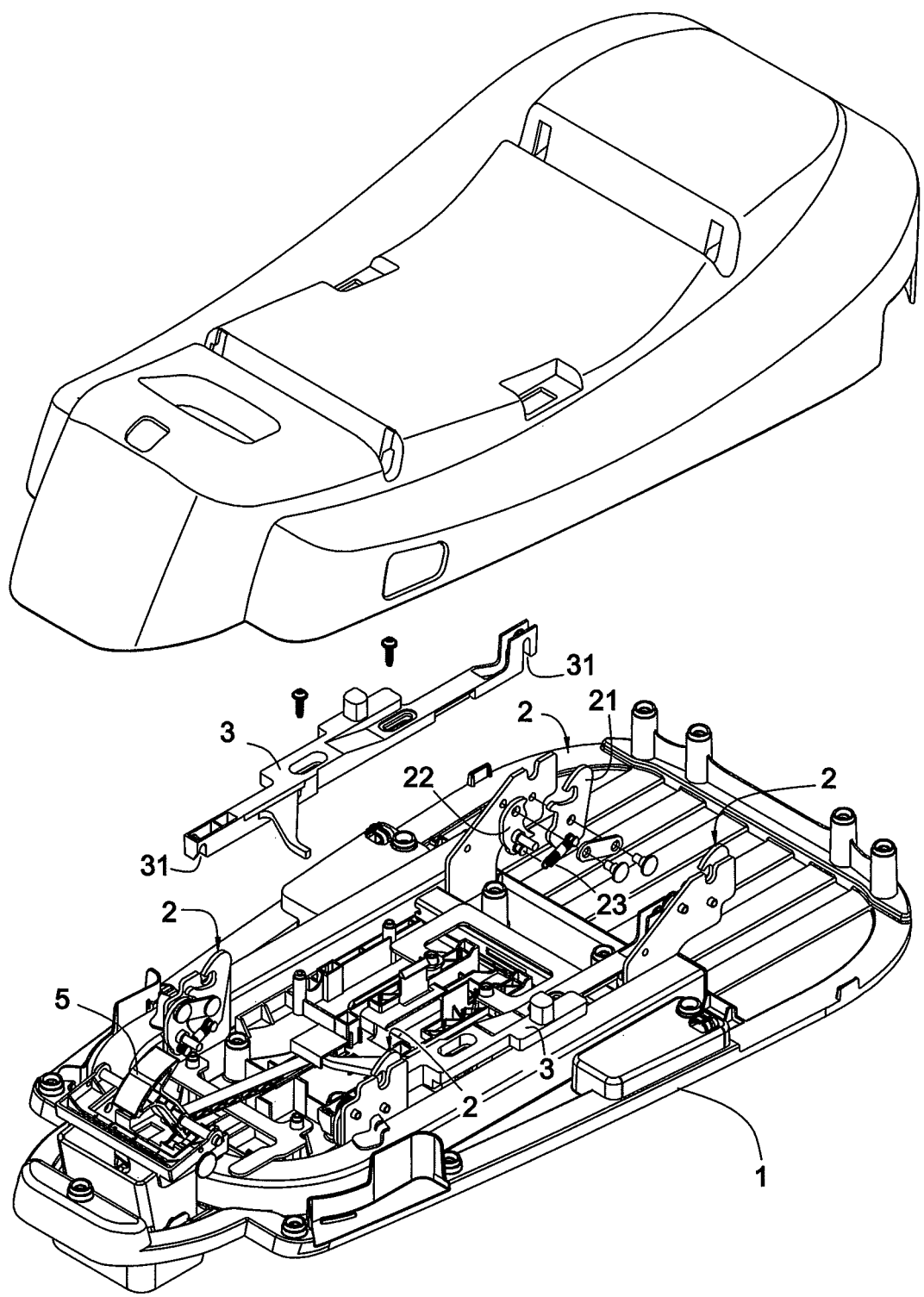
FIG. 1 is an exploded view of the car seat base with a self-keeping lock mechanism according to the present invention.

A car seat base with a self-keeping lock mechanism is use for releasably locking a car seat thereon. Referring to FIG. 1, the car seat (not shown) normally being equipped with a pair of rods 4 fixed at its underside, and the self-keeping lock mechanism is characterized by including at least a front hook element 2 and a rear hook element 2 and at least a front positioner 22 and a rear positioner 22.

Figure 2:
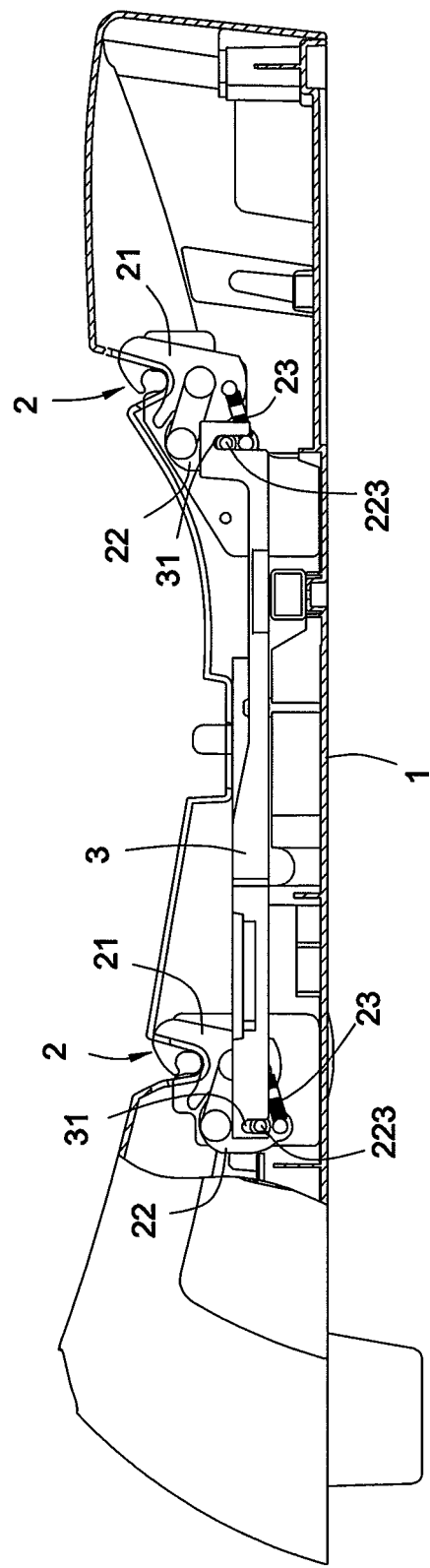
FIG. 2 is a cross-sectional view of the car seat base with a self-keeping lock mechanism according to the present invention.

Referring to FIG. 2, the front hook element 2 and the rear hook element 2 are spaced apart from each other and pivoted inside the car seat base 1 for locking the rods 4 in a closed position, and releasing the rod 4 in an opened position.

Figure 3:
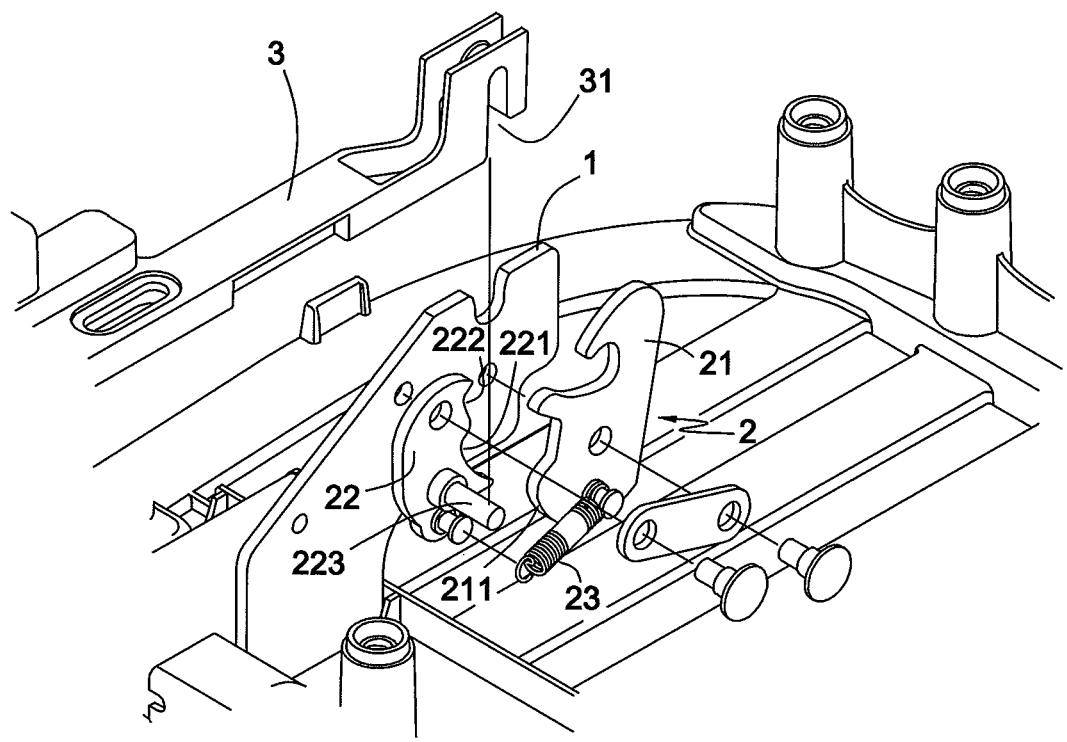
FIG. 3 is an exploded view showing a portion of the self-keeping lock mechanism according to the present invention.
Figure 4:
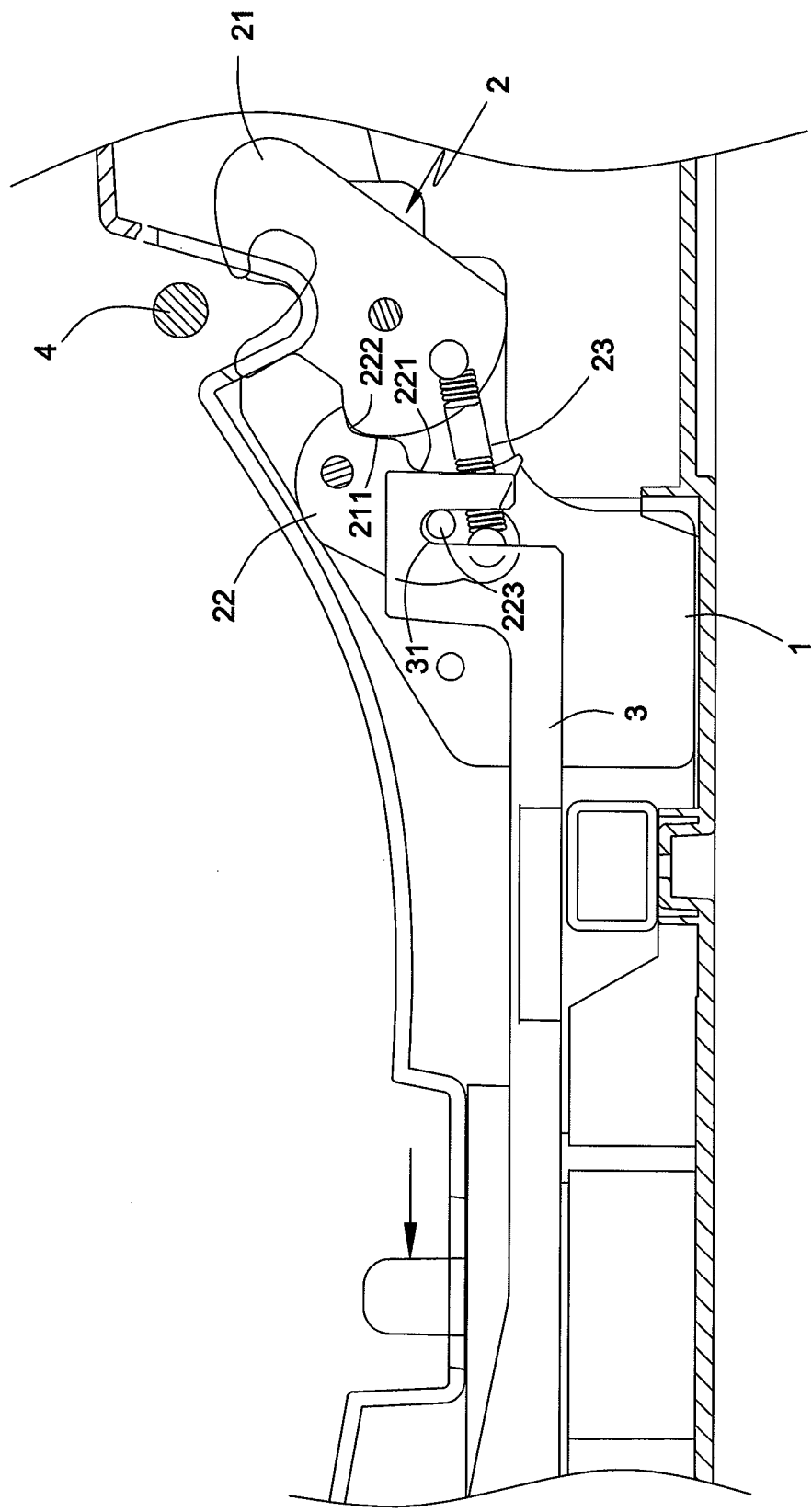
FIG. 4 is a fragmentary, cross-sectional view showing a portion of the self-keeping lock mechanism according to the present invention, schematically depicting a rear hook element of said self-keeping lock mechanism being kept on its opened position by a rear positioner, providing a convenience for loading and locking a car seat on the car seat base.
Figure 5:
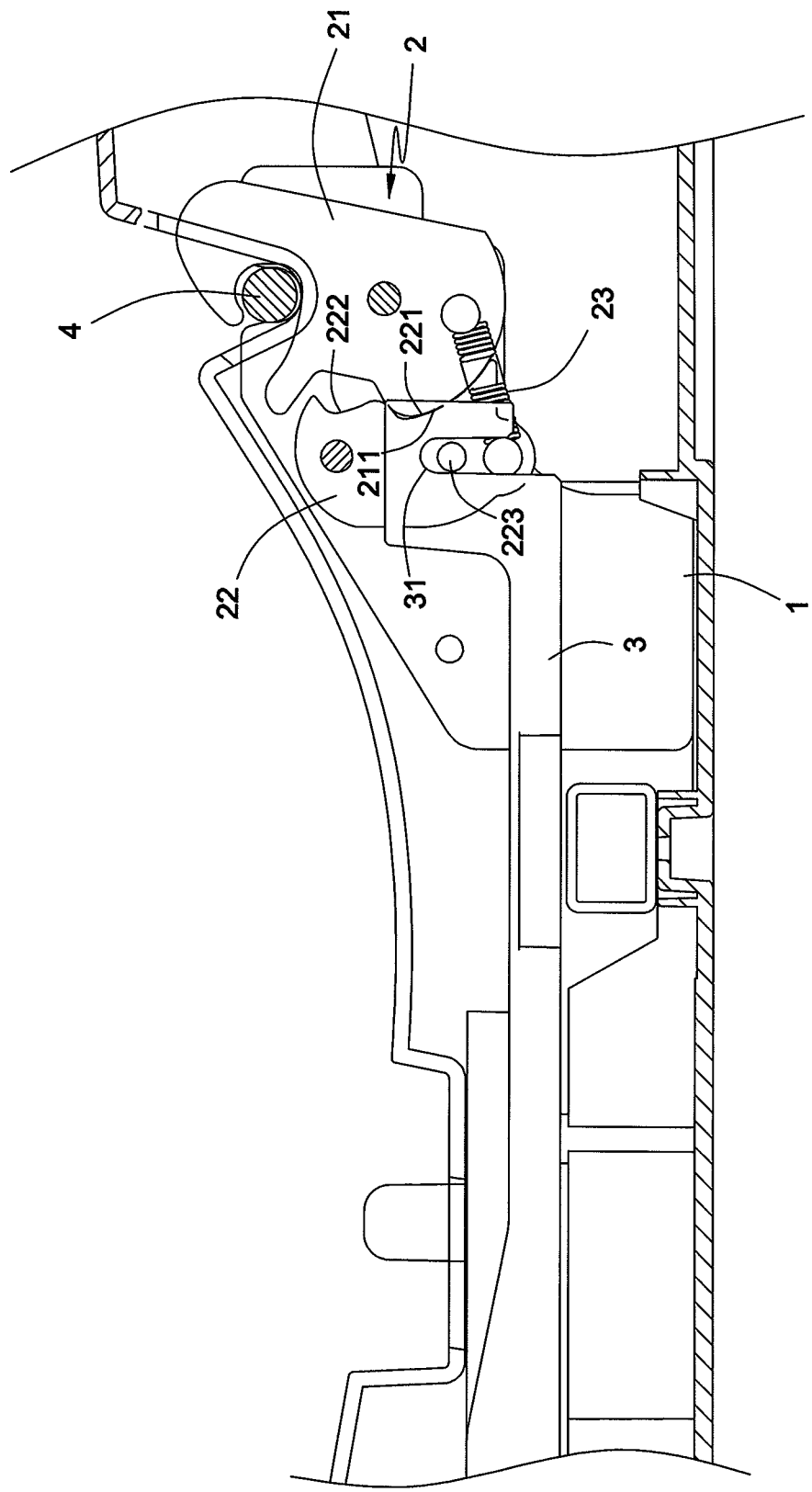
FIG. 5 is a fragmentary, cross-sectional view showing a portion of the self-keeping lock mechanism according to the present invention, schematically depicting a rear hook element of said self-keeping lock mechanism being caught a rod of a car seat, is kept on its closed position by the rear positioner.

Referring to FIG. 3, each of the hook elements 2 may be formed with a hook-like upper end for releasably hooking one of the rods 4 in the closed position. Further, each of the hook elements 2 may be biased by a resilient element 23 and formed with a protruded portion 211 for abutting on the positioners 22 so as to self-kept in the opened position (as shown in FIG. 4) and the closed position (as shown in FIG. 5).

The front positioner 22 and the rear positioner 22 are pivoted inside the car seat base 1 and near the hook elements 2 for keeping the hook elements 2 in the opened position before the rods 4 being entered into and caught by the hook elements 2, and may keep the hook elements 2 in the closed position when the rods 4 have been locked and caught by the hook elements 2.

Preferably, each of the positioners 22 may be formed with a first curved portion 221 and a second curved portion 222 for abutting with the protruded portion 211. When the protruded portion 211 abutted against the first curved portion 221, the hook elements 2 is self-keeping in the closed position; and when the protruded portion 211 abutted against the second curved portion 222, the hook elements 2 is self-keeping in the opened position.

Referring to FIGS. 2 to 5, the self-keeping lock mechanism according to the present invention, may further adopt a link 3 for associating between the front positioner 22 and the rear positioner 22 thereby keeping the front positioner 22 and the rear positioner 22 to rotate simultaneously.

Each of the positioners 22 may have a pivot pin 223 protruded from one side to pivot with the link 3. Preferably, both ends of the link 3 may be formed with a slot 31 for pivoting with the pivot pin 223 protruded from one side of the positioners 22.

When the hook elements 2 are rotated from the opened position as shown in FIG. 4 to the closed position as shown in FIG. 5, the front positioner 22 and the rear positioner 22 will simultaneously rotate in an angle and drive the link 3 to move in a first direction, and vice versa, the link 3 will be driven to move in a second direction.

Figure 6:
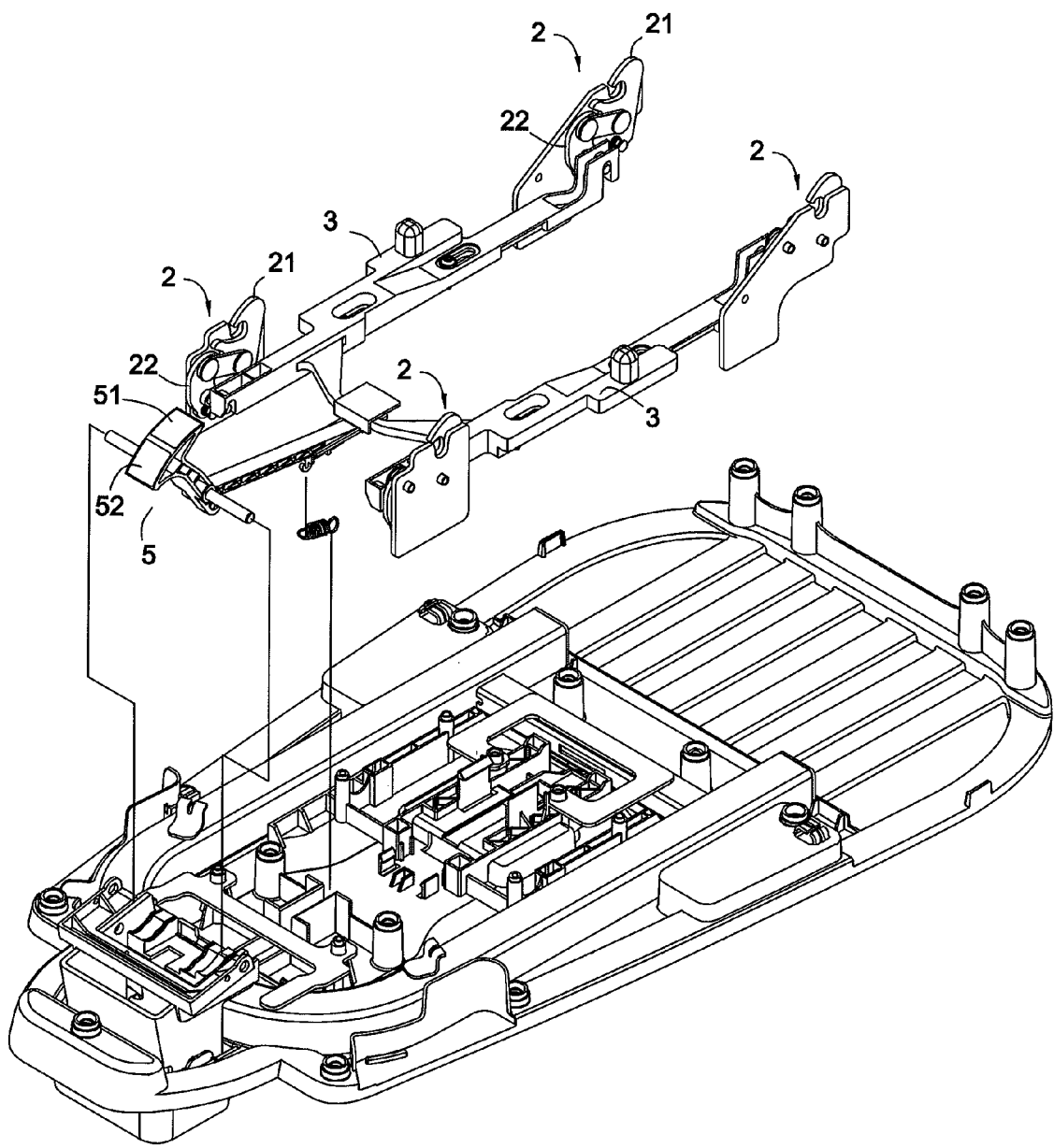
FIG. 6 is an exploded view of the car seat base with a self-keeping lock mechanism further equipped with an indication device for showing the positions of the hook elements of the self-keeping lock mechanism.

Referring to FIG. 6, the link 3 and the positioners 22 may be arranged to associate between an indication device 5 and the hook elements 2. In this embodiment, the indication device 5 is formed with a first color area 51 and a second color area 52.

When both of the hook elements 2 have been kept in the closed position, the link 3 is driven by the positioners 22 to drive the indication device 5 to show the first color area 51. When the hook elements 2 have been kept in the opened position, the link 3 is driven in an opposite direction to drive the indication device 5 to show the second color area 52. By this embodiment, users may assure whether the car seat (not shown) has been locked on the car seat base 1 completely or not.

While particular embodiments of the invention have been described, those skilled in the art will recognize that many modifications are possible that will achieve the same goals by substantially the same system, device or method, and where those systems, devices or methods still fall within the true spirit and scope of the invention disclosed.

What is claimed is:

1. A car seat base with a self-keeping lock mechanism for releasably locking a car seat thereon, wherein the car seat has a pair of rods fixed beneath the car seat, and the self-keeping lock mechanism is characterized by including:
    at least a front hook element and a rear hook element spaced apart from each other and both pivoted inside the car seat base for locking one of the rods in a closed position, and releasing said rod in an opened position;
    at least a front positioner and a rear positioner pivoted near the front hook element and the rear hook element for keeping the hook elements in the opened position before the rods being entered into and caught by the hook elements, and for keeping the hook elements in the closed position when the rods have been locked by the hook elements; and
    a link associated between the front positioner and the rear positioner so as to allow the front positioner and the rear positioner to rotate simultaneously,
    wherein each of the positioners has a pivot pin protruded from one side thereof, and the link is formed with two slots at both ends for pivoting with the pivot pin of the positioners.

2. The car seat base with a self-keeping lock mechanism according to claim 1, wherein each of the hook elements being formed with a hooked upper end for releasably hooking one of the rods in the closed position.

3. The car seat base with a self-keeping lock mechanism according to claim 1 further characterized in that each of the hook elements has a protruded portion biased by a resilient element for abutting on the positioners thereby self-keeping in the opened position and the closed position.

4. The car seat base with a self-keeping lock mechanism according to claim 3 further characterized in that each of the positioners is formed with a first curved portion and a second curved portion for abutting with the protruded portion.

5. The car seat base with a self-keeping lock mechanism according to claim 4, wherein the hook elements are self-keeping in the opened position by having the protruded portion abutting on the second curved portion.

6. The car seat base with a self-keeping lock mechanism according to claim 4, wherein the hook elements are self-keeping in the closed position by having the protruded portion abutting on the first curved portion.

7. A car seat base with a self-keeping lock mechanism for releasably locking a car seat thereon, wherein the car seat has a pair of rods fixed beneath the car seat, and the self-keeping lock mechanism is characterized by including:
    at least a front hook element and a rear hook element spaced apart from each other and both pivoted inside the car seat base for locking one of the rods in a closed position, and releasing said rod in an opened position;
    at least a front positioner and a rear positioner pivoted near the front hook element and the rear hook element for keeping the hook elements in the opened position before the rods being entered into and caught by the hook elements, and for keeping the hook elements in the closed position when the rods have been locked by the hook elements;
    a link associated between the front positioner and the rear positioner so as to allow the front positioner and the rear positioner to rotate simultaneously; and
    an indication device formed with a first color area and a second color area, wherein the link and the positioners are associated between the indication device and the hook elements for indicating the positions of the hook elements.

8. The car seat base with a self-keeping lock mechanism according to claim 7, wherein each of the hook elements being formed with a hooked upper end for releasably hooking one of the rods in the closed position.

9. The car seat base with a self-keeping lock mechanism according to claim 7, wherein when the hook elements have been kept by the positioners in the locked position, the indication device is driven by the link to show the first color area; and when the hook elements have been kept by the positioners in the opened position, the indication device is driven by the link to show the second color area.

10. The car seat base with a self-keeping lock mechanism according to claim 7, further characterized in that each of the hook elements has a protruded portion biased by a resilient element for abutting on the positioners thereby self-keeping in the opened position and the closed position.

11. The car seat base with a self-keeping lock mechanism according to claim 10, further characterized in that each of the positioners is formed with a first curved portion and a second curved portion for abutting with the protruded portion.

12. The car seat base with a self-keeping lock mechanism according to claim 11, wherein the hook elements are self-keeping in the opened position by having the protruded portion abutting on the second curved portion.

13. The car seat base with a self-keeping lock mechanism according to claim 11, wherein the hook elements are self-keeping in the closed position by having the protruded portion abutting on the first curved portion.

* * * * *